United States Patent [19]
Potter, Jr.

[11] Patent Number: 6,072,863
[45] Date of Patent: Jun. 6, 2000

[54] APPARATUS FOR CONDITIONING AUTOMATIC COIN VALIDATION SIGNALS, AND METHOD-OF-USE THEREFOR

[75] Inventor: George M. Potter, Jr., Doraville, Ga.

[73] Assignee: Elcotel, Inc., Sarasota, Fla.

[21] Appl. No.: 09/053,135

[22] Filed: Apr. 1, 1998

[51] Int. Cl.[7] .................................................. H04M 17/00
[52] U.S. Cl. .......................... 379/143; 379/145; 379/146; 379/150
[58] Field of Search ..................................... 379/146, 148, 379/150, 153, 145, 155; 232/7; 194/200

[56] References Cited

U.S. PATENT DOCUMENTS

| | | |
|---|---|---|
| 4,674,114 | 6/1987 | Crouch et al. ........................... 379/146 |
| 4,989,239 | 1/1991 | McGarry .................................. 379/146 |
| 5,084,613 | 1/1992 | Grantland ................................. 379/148 |
| 5,150,403 | 9/1992 | Jordan ...................................... 379/146 |
| 5,168,518 | 12/1992 | Criscenzo et al. ....................... 379/146 |
| 5,907,606 | 5/1999 | Ingalsbe et al. ......................... 379/146 |

*Primary Examiner*—Paul Loomis
*Assistant Examiner*—Quoc Tran
*Attorney, Agent, or Firm*—Schnader Harrison Segal & Lewis

[57] ABSTRACT

An external plug-in module is inserted, or field retrofitted, between a validator and a phone chassis and incorporates circuitry to condition the coin signals generated by the validator. This signal conditioning eliminates the possibility of the chassis being improperly triggered and generating false coin tone signals during periods of interrupted power.

12 Claims, 3 Drawing Sheets ary-electronic or electromechanical in nature) and a telephone chassis containing the electronics that control the operation of the telephone and interface the telephone to the public switched telephone network. The coin validator accepts coins deposited by the user and signals the telephone chassis when a valid coin has been deposited. The signaling generated by the validator also indicates to the chassis the type or denomination of coin deposited. The telephone chassis, upon receiving the signals from the validator, generates the corresponding coin tone signals to the telephone network.

APPARATUS FOR CONDITIONING AUTOMATIC COIN VALIDATION SIGNALS, AND METHOD-OF-USE THEREFOR

BACKGROUND AND SUMMARY OF THE INVENTION

The present invention relates to an apparatus and method for preventing fraudulent uses of a coin operated telephone. More particularly, the present invention relates to an apparatus which comprises conditioning circuitry which incorporates filtering techniques to suppress transients generated within a public coin telephone utilizing an electronic coin validator.

Representative coin validators, currently in use, consist of the AT&T/Lucent Technologies 22 A/B Series Electronic Coin Chute and the LPV 200 WE Series Electronic Coin Chutes manufactured by Mars Electronics International. These units are freely interchangeable with telephone chassis manufactured by a variety of companies.

Under certain conditions (e.g., different combinations of electronic equipment utilized within a standard public coin telephone), fraud can occur, i.e., what is known in the industry as "coin tone" fraud. In this situation, it is possible for users of a public coin telephone to cause the telephone to generate false coin tone signals and thereby make free telephone calls. The end result is that the owner of the public telephone is defrauded.

During normal operation of a public coin telephone, coin tone signals are generated when coins are deposited into the telephone. These tones signal the public switched telephone network as to whether coins have been deposited into the telephone and what the denomination of these coins are.

A public coin telephone contains a coin validator (either fully electronic or electromechanical in nature) and a telephone chassis containing the electronics that control the operation of the telephone and interface the telephone to the public switched telephone network. The coin validator accepts coins deposited by the user and signals the telephone chassis when a valid coin has been deposited. The signaling generated by the validator also indicates to the chassis the type or denomination of coin deposited. The telephone chassis, upon receiving the signals from the validator, generates the corresponding coin tone signals to the telephone network.

Certain combinations of validators and chassis have proven to be subject to compatibility issues which can allow manifestation of the coin tone fraud problem. More specifically, the fraud is created by the user flashing (quickly depressing and releasing) the hook switch on the telephone. This operation causes a brief interruption of the power to the chassis and validator. Under this condition, certain combinations of validators and chassis may cause the erroneous generation of coin tone signals, thereby indicating false coin deposits into the telephone. Typically, the coin tone signals being generated to the telephone network can be faintly heard in the telephone handset receiver. A user, once aware of this condition, could freely cause the telephone to signal false coin deposits and thereby allow the user to make free telephone calls as noted above.

An object of the present invention is to eliminate this problem in a simple, inexpensive and effective manner by providing an external plug-in module, which inserts between the validator and the chassis and has circuitry to "condition" the coin signals generated by the validator. This signal conditioning eliminates the possibility of the chassis being improperly triggered, thereby eliminating the possibility of generating false coin tone signals during periods of interrupted power.

The circuitry according to the present invention incorporates standard filtering techniques to suppress any transients that might be generated during interruption of power to the chassis and validator. These transient may also take the form of voltage spikes in the order of micro-seconds or less.

The filter of the present invention does not drastically alter the nature or timing of the signals generated by the validator and can be used with any combination of validators and chassis that might be encountered in application. Due to the plug-in nature of the module, it has the substantial advantage of being field retrofittable into the public coin telephone and does not require modification to any of the telephone's components, including the validator and chassis.

The module itself, in accordance with the present invention, is comprised of a small housing that can be made of a variety of materials including, but not limited to, plastic or metal. One end of the housing contains a 15– pin subminiature D male connector. The other end of the housing contains a 15– pin subminiature D female connector. These connectors, in turn, mate with the corresponding conventional connectors located on the validator and chassis. No other connections are required for the module to function.

Another object of the present invention to provide an external plug-in module that will eliminate potential coin tone fraud.

It is a further object of the invention to provide an external plug-in module that will work with any combination of validator and telephone chassis.

It is still another object of the present invention to provide an external plug-in module that is completely self-contained.

It is a further object of the present invention to provide an external plug-in module that can be field retrofitted.

Another object of the present invention is to provide an external plug-in module that is transparent to normal signaling.

Other objects, advantages and novel features of the present invention will become apparent from the following detailed description of the invention when considered in conjunction with the accompanying drawings.

DETAILED DESCRIPTION OF THE DRAWINGS

Figure 1:
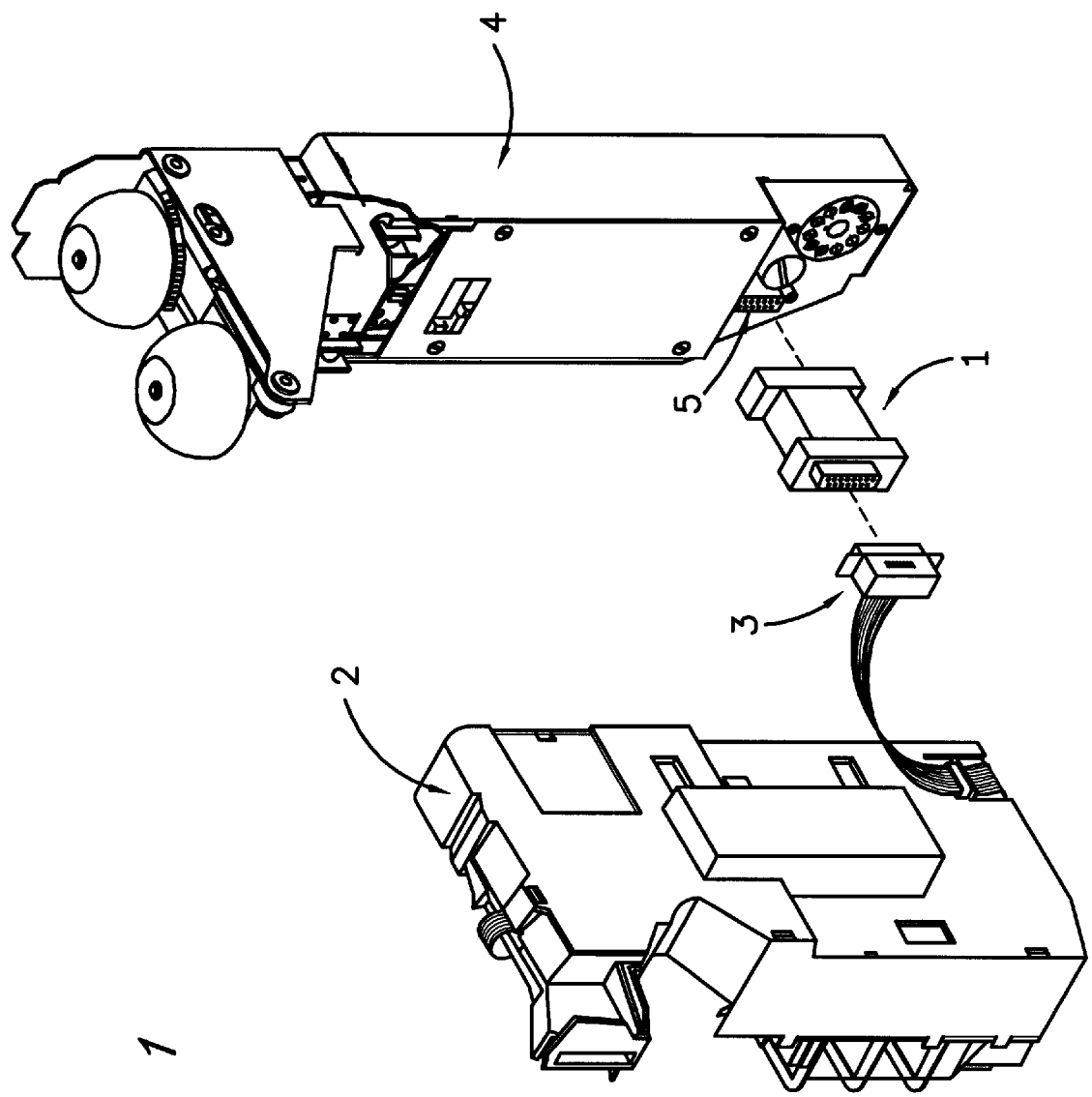
FIG. 1 is an exploded perspective view of the arrangement of the external plug-in module in relation to the validator and the chassis according to the present invention.
Figure 2:
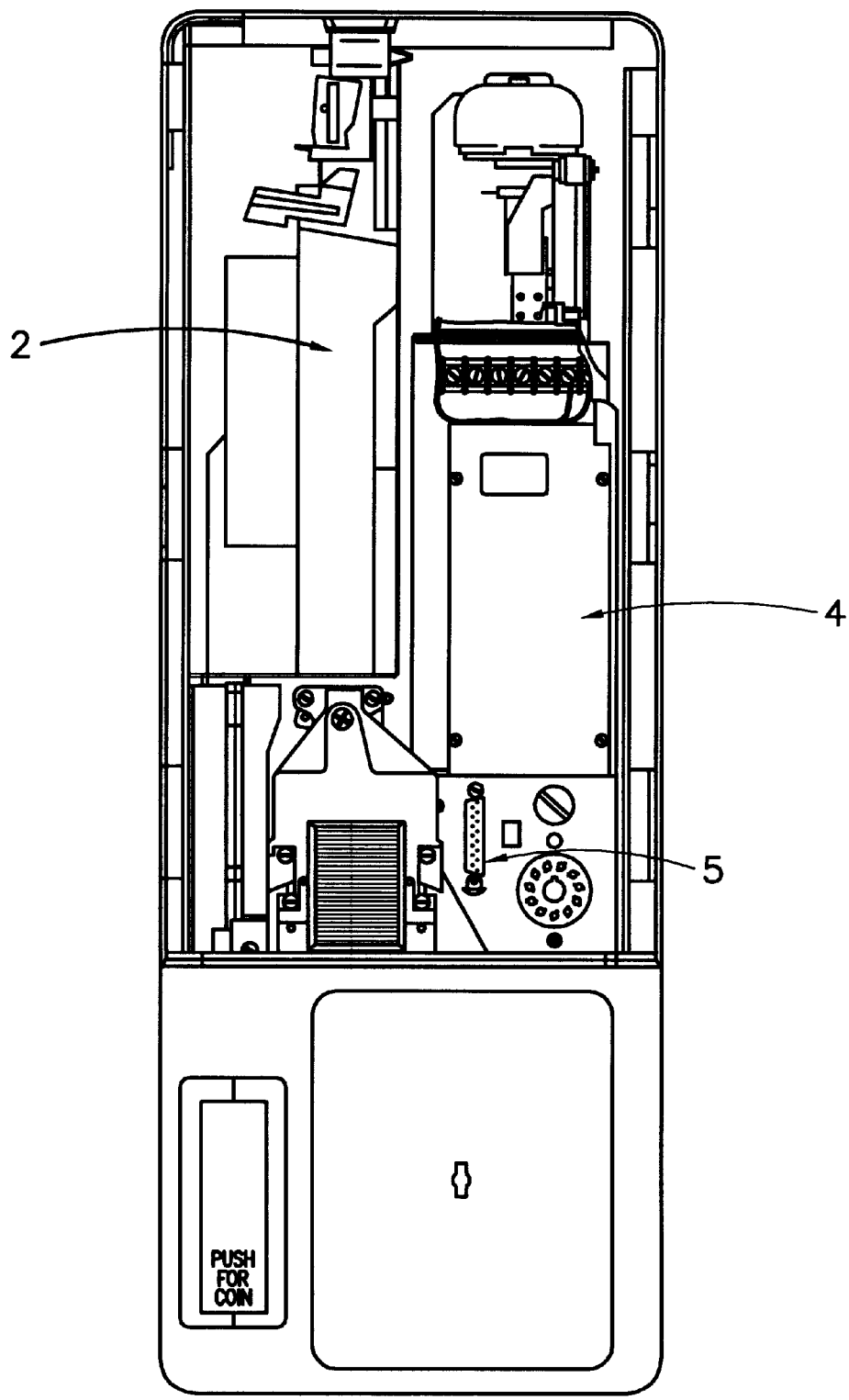
FIG. 2 is a front elevational view of a typical arrangement of a public telephone using the validator and telephone chassis shown in FIG. 1.

FIG. 1 shows an exploded perspective view of the arrangement of the external plug-in module 1 in relation to the validator 2 and the telephone chassis 4 according to the present invention. The external plug-in module 1 is inserted between the telephone chassis 4 and the validator 2. Specifically, the module 1 is inserted between standard male and female 15– pin connectors 3 and 5, respectively. This arrangement is assembled together to form a typical public telephone as shown in FIG. 2.

Figure 3:
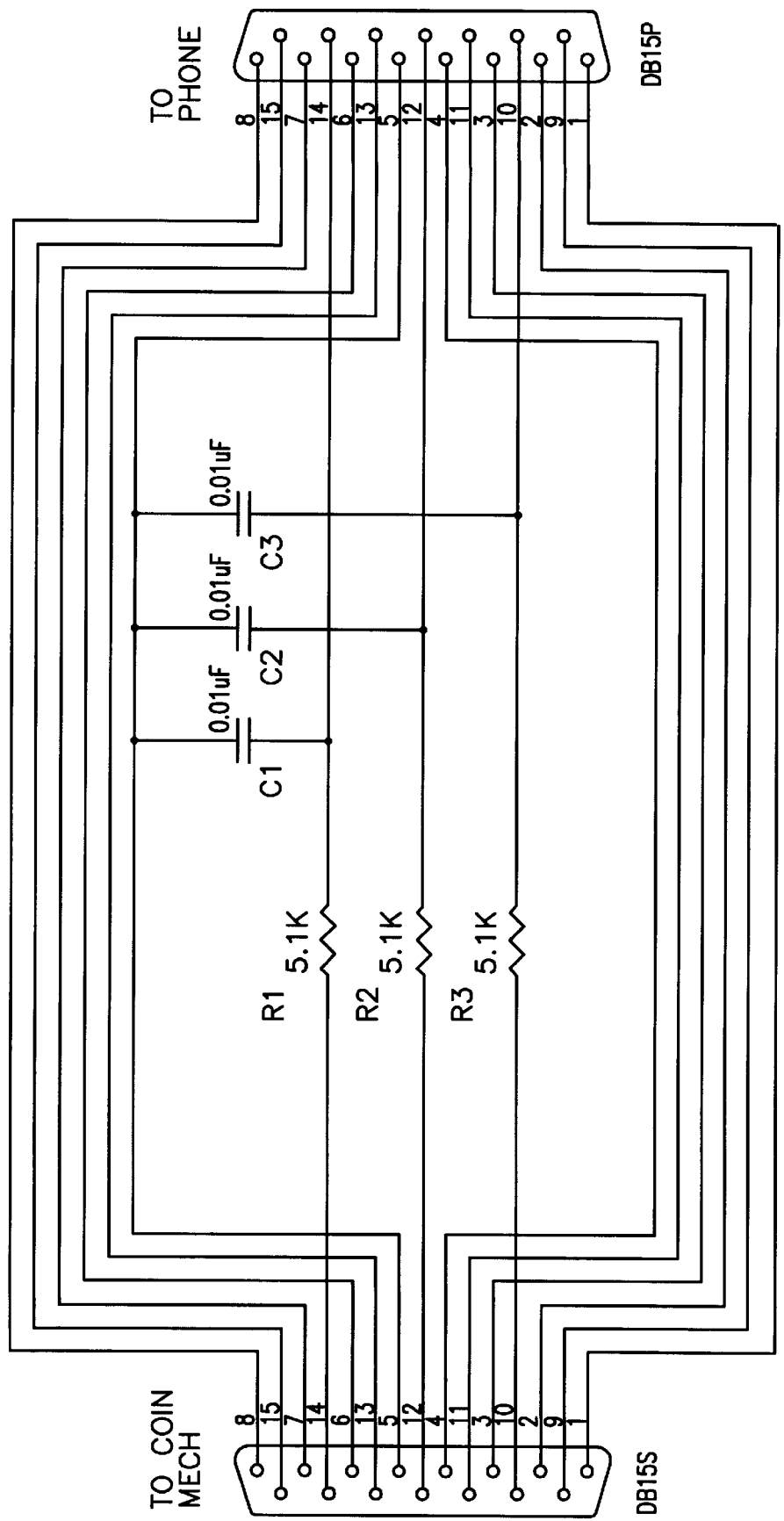
FIG. 3 is a circuit diagram of one embodiment of an external plug-in module in accordance with the present invention.

FIG. 3 shows one specific arrangement of the circuit according to the invention. Pin 5 of male and female 15– pin connectors are connected together and carry the voltage VCC. Connected to VCC at pin 5 of the male and female 15- pin connectors are three capacitors C1, C2 and C3. The opposite side of capacitor C1 is connected to resistor R1. Resistor R1 is connected to pin 14 of the female connector at one end, and along with capacitor C1 to pin 14 of the male connecter at the other end. Capacitor C1 along with resistor R1 forms a first RC network for filtering of the coin validation signals.

With a first side of capacitor C2 connected to pin 5 of the male and female 15- pin connectors, the opposite side of capacitor C2 is connected to resistor R2. Resistor R2 is connected to pin 12 of the female connector at one end and along with capacitor C2 to pin 12 of the male connecter at the other end. Capacitor C2 along with resistor R2 forms a second RC network for filtering of the coin validation signals.

With a first side of capacitor C3 connected to pin 5 of the male and female 15- pin connectors, the opposite side of capacitor C3 is connected to resistor R3. Resistor R3 is connected to pin 10 of the female 15- pin connector at one end, and along with capacitor C3 to pin 10 of the male 15- pin connecter at the other end, thus forming a third RC network for filtering of the coin validation signals. The three RC networks each have a time constant of approximately 0.03 msec.

As for the remainder of the pins on the 15- pin male and female connectors (1–4, 6–9, 11, 13 and 15), the pins on the male connector are tied to corresponding pins on the female connector to form simple pass through connections.

The RC networks effectively remove spurious signals (e.g., transients in the form of micro-second voltage spikes) generated during power anomalies or transitions within the public telephone. This enables the coin validator and chassis to operate properly and not generate spurious coin tone signals to the telephone network. Of course, it would be understood that other types of RC networks as well as other types of filters can be used without departing from the basic principles of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A signal conditioner for a coin validator associated with a pay telephone, comprising:

a first connector connectable to a coin validator;

a second connector connectable to a pay phone chassis;

a device between the, first and second connectors for filtering at least one validation signal from the coin validator; and wherein said signal conditioner is dimensioned and configured for insertion in said pay telephone between said pay phone chassis and said coin validator.

2. The signal conditioner as set forth in claim 1, wherein the first and second connectors are female and male connectors, respectively.

3. The signal conditioner as set forth in claim 1, wherein the device comprises:

a first network for filtering a first validation signal of the at least one validation signal received from the first connector;

a second network for filtering a second validation signal of the at least one validation signal received from the first connector; and a third network for filtering a third validation signal of the at least one validation signal received from the first connector.

4. The signal conditioner as set forth in claim 3, wherein said first second and third networks include a resistor operatively connected with at least one capacitor, respectively.

5. The signal conditioner as set forth in claim 4, wherein the first and second connectors are female and male connectors, respectively.

6. The signal conditioner as set forth in claim 5, wherein an end of each of said first, second and third networks is connected to a respective pin of the female connector, and an opposite end of each of said networks is connected to a respective pin of the male connector.

7. The signal conditioner as set forth in claim 6, wherein said end of each of the first second and third networks is connected to fourteenth, twelfth and tenth pins of the first connector and said opposite end is connected to fourteenth, twelfth and tenth pins of the male connector, respectively.

8. A method of conditioning signals between a coin validator and a pay telephone chassis, comprising the steps of:

receiving at least one validation signal from the coin validator in a device dimensioned and configured for insertion in said pay telephone between said coin validator and a pay phone chassis;

filtering erroneous coin signals from the at least one validation signal; and providing the at least one filtered validation signal to a telephone chassis of the pay telephone.

9. A method of preventing coin tone fraud comprising:

operatively inserting a signal conditioner between a coin validator and a telephone chassis of a pay telephone; and wherein said signal conditioner is dimensioned and configured for insertion in said pay telephone between said telephone chassis and said coin validator.

10. The method as set forth in claim 9, wherein the signal conditioner filters at least one validation signal.

11. The method as set forth in claim 9, wherein a signal conditioner receives at least one validation signal from a coin validator; filters the at least one validation signal; and provides the at least one validation signal to the telephone chassis.

12. The method as set forth in claim 9, wherein the step of operatively connecting consists of utilizing an RC circuit as a filter for at least one validator signal.

\* \* \* \* \*